United States Patent [19]

Granger

[11] 3,986,202

[45] Oct. 12, 1976

[54] PROCESSING APPARATUS AND METHOD FOR COLOR VIDEO SIGNALS

[75] Inventor: Edward M. Granger, Rochester, N.Y.

[73] Assignee: Eastman Kodak Company, Rochester, N.Y.

[22] Filed: Mar. 5, 1975

[21] Appl. No.: 555,479

[52] U.S. Cl. .................................... 358/4; 358/1
[51] Int. Cl.² ...................... H04N 5/76; H04N 9/02
[58] Field of Search ................. 358/4, 1, 12, 21, 9, 358/11, 47

[56] References Cited
UNITED STATES PATENTS

| 2,892,883 | 6/1959 | Jesty et al. | 358/47 |
| 3,449,509 | 6/1969 | Hobbs et al. | 358/1 |

*Primary Examiner*—Robert L. Griffin
*Assistant Examiner*—Mitchell Saffian
*Attorney, Agent, or Firm*—G. E. Grosser

[57] ABSTRACT

An information processing method and apparatus, which is adapted to use, for example, in the recording of color image information, calls for sampling a set of basic colors (e.g., green, red, and blue) at rates which are proportioned according to the resolving power of the human visual system respective of color, and arranging the resulting samples to produce a sequential video signal. In one implementation, green, red, and blue color image information is sampled at respective rates decreasing progressively from green to red to blue in producing a sequential signal which is recorded, and on playback a luminance signal for, say, a television display is derived from the sequential signal based only on the relatively high frequency (preferably both green and red but not blue) sample information. Moreover, to improve image registration with such customized sampling, delays are selectively interposed in the individual color signals in accordance with their respective sampling frequencies.

6 Claims, 6 Drawing Figures

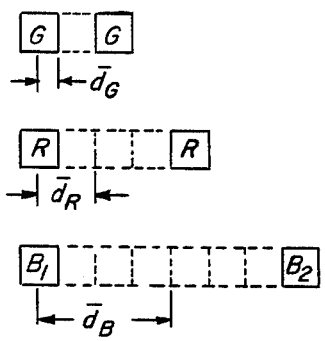
FIG. 2A
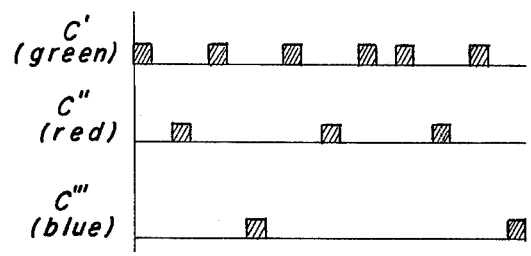
FIG. 2B
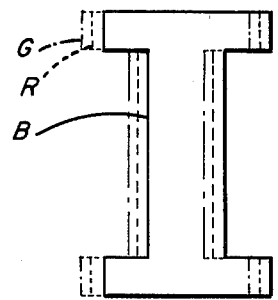
FIG. 3A
FIG. 3B

PROCESSING APPARATUS AND METHOD FOR COLOR VIDEO SIGNALS

BACKGROUND OF THE INVENTION

1. Field of the Invention

The invention relates to video signal compression and more particularly to video signal compression apparatus and methods which repeatedly sample image information for a set of basic colors to produce a sequential color video signal.

2. Description Relative to the Prior Art

In developing a video signal recording or transmission system, bandwidth compression of the image representative signals becomes a basic practical concern. Such compression must be accomplished, however, while preserving sufficient image detail to provide a final display image of satisfactory quality. Considering the standard NTSC signal format, for example, concern for bandwidth conservation is evidenced in use of special chrominance interleaving and in the selection of bandwidth allocations among the three signal types: Y, I, and Q. These particular techniques are effective to compress overall signal bandwidth because the NTSC video signal is a composite of analog signals which occur concurrently and bear dissimilar quantities of information.

Another signal format which has been proposed intermixes basic color samples in a repeated sequence (e.g., green, then red, then blue) along a scan line to produce a sequential output signal. This signal format is generally referred to as "dot-sequential" and results in a time division multiplexed color video signal (see "A Six-Megacycle Compatible High-Definition Color Television System" by RCA Laboratories Division, Princeton, New Jersey, published in RCA Review, December 1949, pages 504 through 522). This approach relies on integration of the "dot" elements along the scan lines of a final display by the human visual system to "fill in the gaps" between dots and, in doing so, seeks to save signal bandwidth by updating each basic type of image information only intermittently. To provide, with the dot-sequential signal format, greater information concerning luminance detail, a relatively high frequency signal is typically superposed on the sequential signal. (See RCA Laboratories Division article mentioned above.)

National standardization on the NTSC format precludes use of the "dot-sequential" format for broadcasting; nonetheless, significant use possibilities exist in the fields of video recording and in closed circuit video transmission. One difficulty with using the dot-sequential format, however, arises as a result of the large number of elements (dots) which are necessary to represent an image of satisfactory quality. Moreover, while this type of format is, because of its sequential nature, well suited to digital encoding, such encoding is not readily compatible with the use of a concurrent luminance signal unless a separate channel is used.

SUMMARY OF THE INVENTION

The invention proposes in a color video system to sample a set of basic colors in such a way that color sample populations are produced which are proportioned in relation to the visual system's ability to resolve detail for each respective base color. Preferably, a sampling apparatus intermixes color samples along individual line scans at relative sampling rates matched to the visual system's respective resolving power for detail to produce a sequential composite signal. In a preferred implementation, green, red, and blue information is intermixed during individual line scans in ratios of approximately 6 to 3 to 1, respectively.

A key aspect of the above-described invention provides for selectively delaying individual samples in relation to their corresponding sampling rates to cause the less frequent sample types (by color) to be shifted timewise so as to occur at a time which would correspond with a center sample of a given image area. This relative shifting proves advantageous because the scan distance between samples (information updating) is greater at lower frequencies and, accordingly, such samples are taken to represent a relatively extended area in the scan direction.

In one form of the invention recognition is taken of the rates at which new information arrives (sampling frequencies) in deriving a luminance signal for visual display by defining a luminance estimating vector which does not include a contribution from the least-sampled basic color. Hence, if green, red, and blue are used as the basic colors, luminance would preferably be estimated using only green or both green and red sample information $$(\text{e.g.,} \ Y' = \frac{2}{3}G + \frac{1}{3}R).$$

While the term "basic color" has been used in describing samples, it should be appreciated that a luminance sample could serve as a basic color sample and would have, in accordance with the invention, a sampling rate proportioned to the human visual system's resolving power for luminance detail.

The invention will be described in detail with reference to the drawings, wherein:

FIG. 2A is a representation used in describing a video data pattern;

FIG. 2B is a representation of timing sequences for sampling in accordance with the data pattern of FIG. 2A;

FIGS. 3A and 3B are diagrams useful in describing the invention; and

Figure 1:
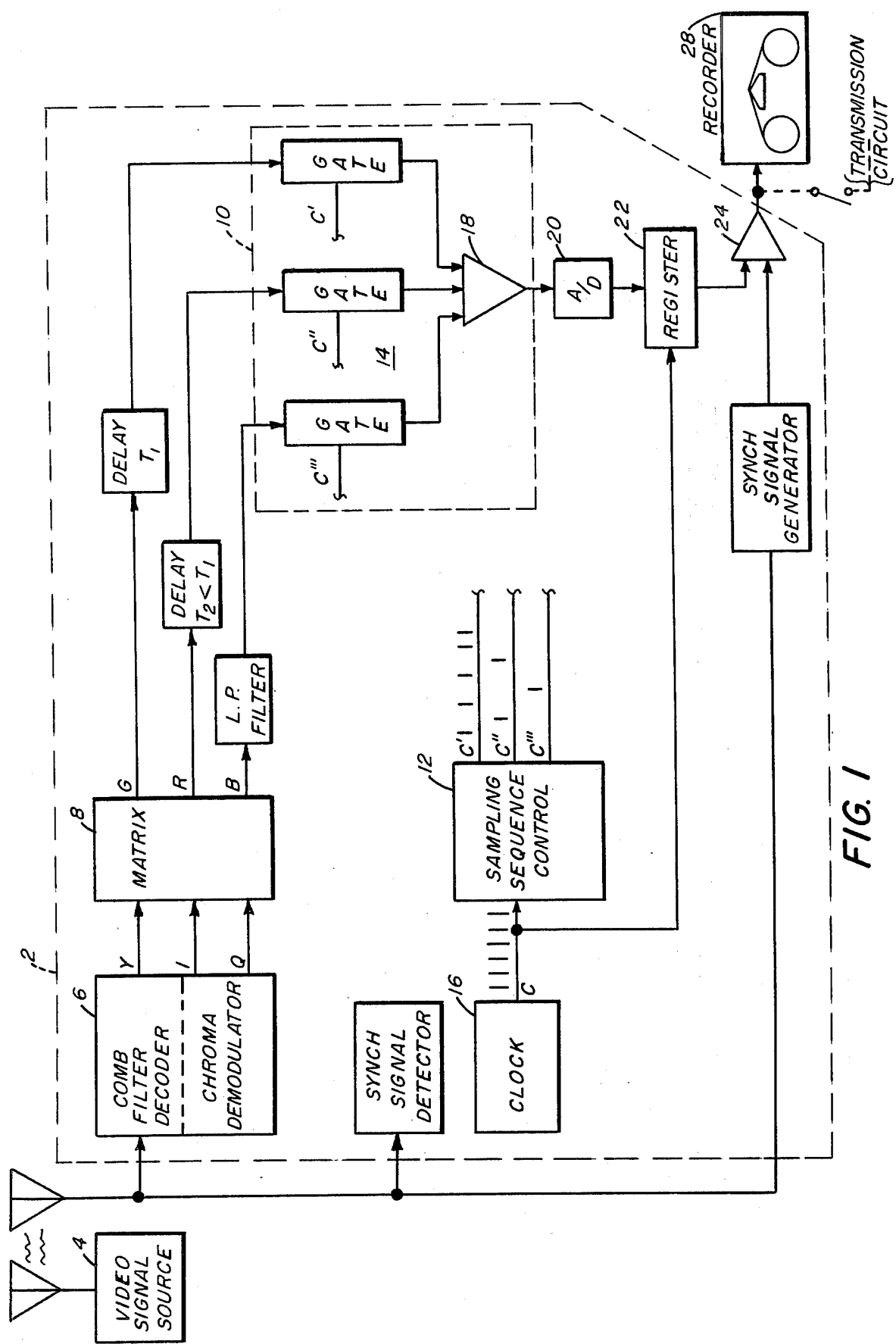
FIG. 1 is a diagram, generally in block form, representing a video signal processing arrangement in accordance with the invention.

Referring to FIG. 1, a signal processing apparatus 2 which implements the invention receives a broadcast signal (NTSC format) from a source 4 and separates that signal into Y, I, and Q component signals by means of a decoder 6 (which may include a comb filter). Preferably, a matrix circuit 8 is then utilized to combine the Y, I, and Q signals to produce new signals based on green, red, and blue as basic colors. With this particular basic color selection, two of the image signals have large components of luminance information; namely, the green and red signals.

From the matrix 8, image signals (denoted G, R, and B) are selectively delayed and sent to a sampling apparatus 10, the purpose for which is discussed below. Sampling of these image signals is then effected sequentially and in a preselected order by means of a sampling sequence control 12 cooperating with a set of signal gates 14.

The sampling sequence control 12 receives pulses from a clock 16 and responsively sends out pulses which are distributed among three output channels (denoted C', C'', and C''') in accordance with a preselected switching sequence. Pulses from the clock 16 occur at a preselected rate which is the desired overall sampling rate. Pulses are distributed to the individual channels C', C'', and C''', in accordance with the invention, at respective rates proportioned to the resolving power of the human visual system for detail of the respective basic colors. Such a pulse distributing operation is preferably effected by a programmed read-only memory coupled to a counter which receives the pulse output signal of clock 16. An arrangement of standard logic circuits to provide the necessary distribution may as an alternative be implemented using known technology (see Ledley, "Digital Computer and Control Engineering", McGraw-Hill, 1960). An example of a specific switching sequence for apparatus according to the invention is described below.

Signal segments from gates 14 are combined at a summing circuit 18, thereby to form a sequential image signal. After being so combined, the sequential signal is changed to a coded format by an analog-to-digital converter 20. The converted signal is read into a register 22 during each sample period responsive to signal pulses from the clock 16. A summing amplifier 24 combines the digitally coded output signal of the register 22 with synchronizing signals from a signal generator 26 and sends the combined signal to a utilization device, such as a recorder 28 or to a transmission circuit.

FIG. 2A shows, pictorially, a sampling sequence which is in accordance with the invention. Green, red, and blue (denoted G, R, and B, respectively) image information is sampled in ratios approaching 6 to 3 to 1. Such ratios are thought to be consistent with the corresponding ratios for resolving power of the human visual system. It should be appreciated, however, that a compression of information according to the invention occurs whenever image sampling deviates from uniform sampling rates toward proportioned rates which correspond to the resolution of the human visual system.

In FIG. 2B, signals C', C'', and C''' are shown graphically for the sampling sequence of the first row in FIG. 2A.

Referring to FIGS. 3A and 3B, the advantage obtained through the selective delay of the color signals, as mentioned above, will be explained. In FIG. 3A, the average distance (denoted $\bar{d}_G$, $\bar{d}_R$, $\bar{d}_B$) between the scan locations where a sample is taken and the center of the scan interval represented by that sample are pictorially illustrated for left-to-right scanning. For a high sampling frequency, such as the "green" sampling of the preferred implementation, the center of the area extending to the next sample update is only slightly displaced from the sample itself. For a low frequency sample, such as a blue sample, however, the corresponding center is a significant distance away in terms of sample intervals. (In other words, $B_1$ must represent blue information until the update $B_2$.) This phenomenon tends to cause a relative image shifting or misregistration, as shown in FIG. 3B. By selectively delaying the color samples, according to a respective sampling frequency, it is possible to, in effect, shift the sampling locations for infrequently sampled colors to the right relative to the higher frequency samples and thereby correct to a large degree, if not entirely, the misregistration. Considered another way, the delay causes the blue information to lead the green and red information (assuming green, red, and blue are the basic colors) and hence the blue signal represents, at a given point in time, image detail at a relatively advanced position on the scan path. It is adjusting this effective anticipation (advance in time) to correspond to the difference in the distances to respective sample area centers that misregistration of the represented images is avoided.

Figure 4:
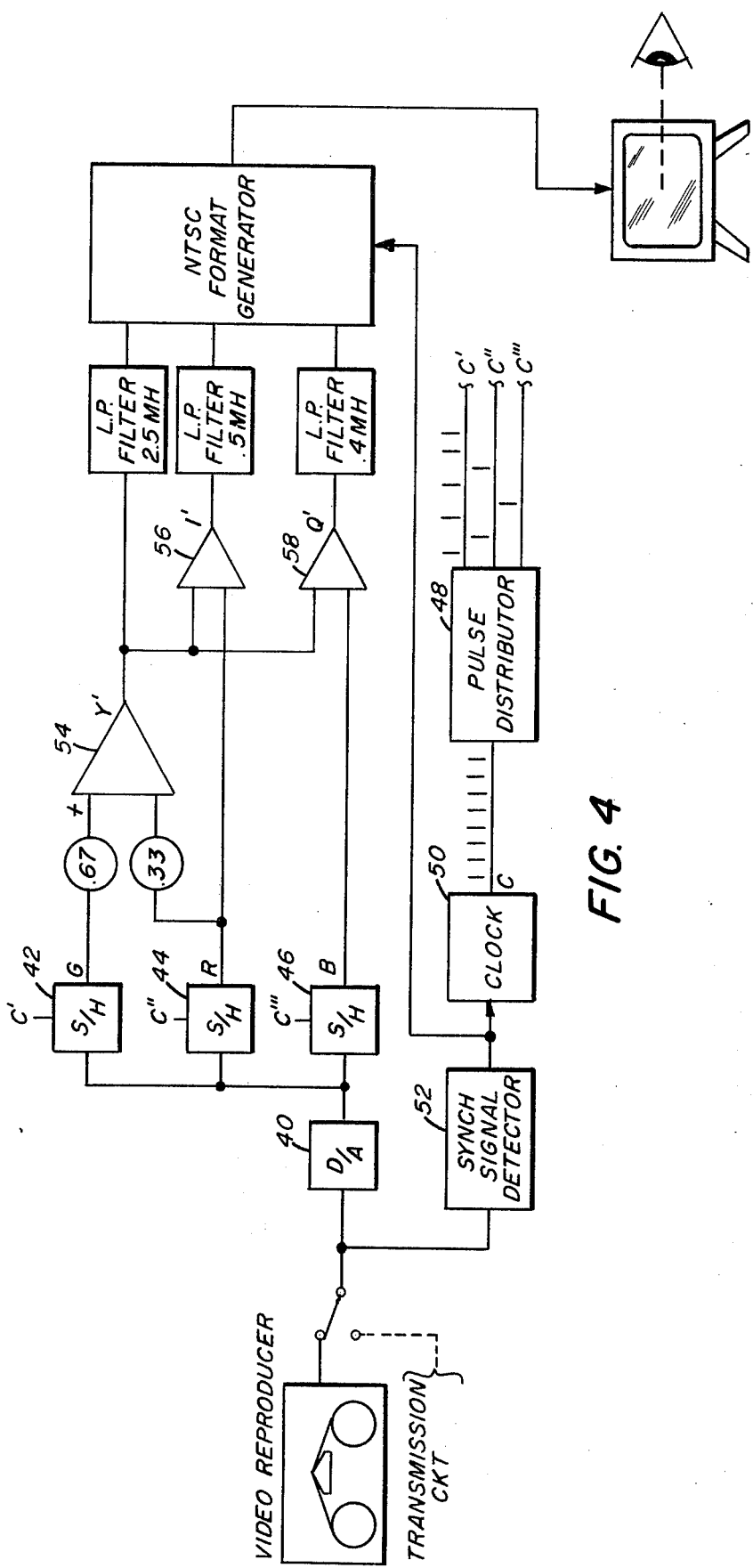
FIG. 4 is a diagram generally in block form of a signal processing arrangement in accordance with the invention which is adapted to receive processed video information of the type produced by the arrangement of FIG. 1.

Referring now to FIG. 4, a playback arrangement according to the invention is adapted to respond to time-division-multiplexed image signals of the type described with respect to FIG. 1 as received from, for example, a video reproducer 38 or a transmission circuit. The image signal is first sent to digital-to-analog converter 40 and after conversion thereby to a set of parallel sample-and-hold circuits 42, 44, and 46. Operation of the sample-and-hold circuits 42, 44, and 46 is controlled by signals C', C'', and C''', respectively, which are produced by a pulse distribution circuit 48. Signals C', C'', C''' correspond to the similarly identified signals which were discussed with respect to FIG. 1. The pulse distributor 48 is preferably a read-only memory cooperating with a counter which is coupled to receive signal pulses at the overall sampling rate from a clock 50 (a similar arrangement to that of elements 12 and 16 of FIG. 1). Triggering of the clock is effected by detector 52 responsive to the synchronizing signals in the reproduced image signal.

Because the output signals C', C'', and C''' of pulse distributor 48 have a time relationship corresponding to the signals used in producing the multiplexed image signal, the sample-and-hold circuits 42, 44, and 46 act as demultiplexers and at their outputs provide green, red, and blue image signals, respectively.

In accordance with a feature of the invention, a luminance estimating signal is generated based only on highly sampled types of image information. Hence, if blue is selected as a basic color, the blue information (which, according to the invention, would be sampled at a relatively low rate because the human visual system has low resolution for blue detail) would not contribute to the luminance estimate. To provide a preferred form of luminance estimate, green and red signals are combined by a summing circuit 54 (producing a signal Y'). A contribution ratio of ⅔ green to ⅓ red is preferably used, such ratio corresponding closely to the ratio of those components in the NTSC luminance signal. Modified I and Q signals (i.e., modified from the NTSC standard) are generated by subtracting Y' from the red and blue signals at summing circuits 56 and 58 to produce signals I' and Q', respectively. The Y', I', and Q' signals are then filtered by respective low pass filters and sent to an NTSC format generator which produces based thereon a broadcast-type signal.

The invention has been described in detail with particular reference to preferred embodiments thereof, but it will be understood that variations and modifications can be made within the spirit and scope of the invention. As an example, proportioned image sampling according to the invention may be effected using imaging arrays having selectively sensitized elements arranged in patterns in which element types occur at rates proportioned to the resolving power of the human visual system for respective color detail.

What is claimed is:

1. In a color video system which produces contemporaneous image signals from which a set of basic colors may be derived, a signal processor comprising:

means for sampling said signals, such means including (a) means for programming a color sampling sequence wherein basic color samples occur at rates related to the resolution of the human visual system for detail in such colors, and (b) means responsive to said sequence programming means for extracting basic color samples from said image signals in accordance with said basic color sequence;

means for receiving and for combining the basic color samples into a time-division-multiplexed signal;

intermediate means for receiving said time-division-multiplexed signal; and means for receiving said time-division-multiplexed signal from said intermediate means for separating the basic color samples and for applying them to respective signal channels based on said preselected sequence.

2. A signal processor according to claim 1 wherein said intermediate means is a signal recording and reproducing system, whereby the bandwidth of said recording and reproducing system may be reduced as a result of such sampling.

3. A signal processor according to claim 1 additionally including means for delaying the basic color signals respective to certain amounts which correspond to the sampling rate.

4. For use in a color video system which produces three image-representative base color signals, a signal processor comprising:

means for sequentially sampling such base color signals with respect to color, said sampling means including (a) programmed means for establishing a preselected color sampling sequence, which sequence proportions the population of resultant samples among the base colors in relation to the resolving power of the human visual system for color detail, and (b) means, responsive to said programmed means, for receiving said base color signals and for extracting color samples in accordance with said sequence;

combining means for receiving the color samples produced by said sampling means and for combining such samples to produce a time-division-multiplexed signal;

recording means for receiving said multiplexed signal and for recording that signal on a record medium;

means for reproducing the recorded signal;

means for demultiplexing the output signal from said reproducing means in accordance with said color sampling sequence to produce a second set of basic color signals;

means for receiving said second set of basic color signals and for combining only the two basic color signals having the highest sampling populations in a preselected ratio, by which the highest sampled color is weighted more than the second highest, to produce a luminance-type signal;

means for receiving said second set of basic color signals and for producing two chrominance-type signals based on preselected ratios of all three basic color signals; and a format generator for receiving the luminance-, and chrominance-type signals and producing based thereon a standard video broadcast signal.

5. A color video recording system comprising:

means for receiving a color video broadcast signal;

means for decoding the broadcast signal and for producing based thereon three basic color signals;

delay means for selectively delaying the individual basic color signals;

means for sampling the basic color signals at rates proportioned to the resolving power of the human visual system, said sampling means including programmable means for establishing a preselected color sampling sequence wherein respective colors occur at ratios corresponding to human visual acuity, and means responsive to said programmable means for extracting samples from said basic color signals in accordance with said color sampling sequence;

means for receiving the samples produced by said sampling means and for combining them to produce a sequential video signal; and recording means for recording said sequential video signal on a recording medium, wherein said delay means selectively delays the color signals in relation to the sampling rates for the respective colors represented.

6. In a color video system, a color image processor comprising:

means for producing a time sequence of basic color signals, representative of such a color image, said producing means including means for establishing a preselected color sequence for the basic color signals, which sequence specifies the respective basic colors in proportions corresponding to the relative acuity of the human visual system for such colors;

means for receiving said time-sequential signals and for, based on said sequence, separating such signals by color and applying them to individual signal channels; and delay means for selectively delaying said basic color signals certain amounts which correspond to the relative proportions of said basic colors in said sequence.

* * * * *